Oct. 10, 1972    J. E. P. PICKETT    3,697,299

MICROSCOPY TISSUE RECEPTACLE METHOD

Original Filed Aug. 3, 1967

3,697,299
MICROSCOPY TISSUE RECEPTACLE METHOD
John E. P. Pickett, 3323 Pinafore Drive,
Durham, N.C. 27705
Original application Aug. 3, 1967, Ser. No. 658,252, now Patent No. 3,536,040. Divided and this application Sept. 23, 1969, Ser. No. 860,256
Int. Cl. A01n 1/00
U.S. Cl. 117—3     4 Claims

ABSTRACT OF THE DISCLOSURE

Minute tissue particles for light or electron microscopy are processed in a receptacle comprised of a porous polyethylene or polypropylene open-ended, cylindrical body and a pair of porous hydrophilically treated polyethylene or polypropylene caps for closing the respective ends. During processing, tissue particles having at least one dimension in the order of one millimeter are stored in the receptacle after which the receptacle is submerged in various organic fixative and processing liquids which gain access to the particles by passing through the porous cylindrical body and caps and in various aqueous fixative and processing solutions which gain access to the tissue by passing through the porous hydrophilically treated caps.

CROSS REFERENCE TO RELATED APPLICATION

This application is a division of my copending application Ser. No. 658,252 filed Aug. 3, 1967 entitled "Microscopy Tissue Receptacle And Method," now U.S. Pat. No. 3,536,040.

BACKGROUND OF THE INVENTION

(1) Field of the invention

This invention relates to a method for transporting and processing small tissue particles through electron microscopy fixative and processing fluids and alternatively through light microscopy fixative and processing fluids and to a method of processing such particles.

(2) Description of the prior art

A tissue carrier method of the type most closely related to this invention is taught by U.S. Pat. 2,996,762 to McCormick, 3,128,902 to Barnum and my U.S. Pats. 3,411,185 and 3,456,300. The method using the Barnum structure is typical of the type of receptacle method used for transporting relatively large tissue specimens through light microscopy fixation and processing fluids. Small tissue particles of the size processed by the method of this invention would escape the Barnum receptacle because of its relatively large openings. The McCormick structure is comprised of an embedding box and a boat receptacle and requires a corresponding method of use. In the McCormick method, the McCormick structure is used only to embed tissue in paraffin and it is not subjected to the various fixation and processing fluids. My Pats. 3,411,185 and 3,456,300 effectively combine in their teachings the Baarnum and McCormick structures so that in their method of use relatively large tissue specimens may be subjected to the fixation and processing fluids and then embedded in paraffin without being removed from the structure.

The present method of transporting light microscopy tissue through the fixative and processing fluids includes placing tissue in "tea bags" called moss embedding bags, plastic or stainless steel cassettes and sometimes large pieces are processed in folded gauze. The contained tissues are placed into a series of beakers each containing one of the fixative or processing liquids. Upon the completion of this process, the tissue is removed and the tissue is embedded in paraffin, cut on a microtome, stained and viewed under the light microscope.

In contrast to handling large tissue and light microscopy tissue, the tissue for electron microscopy may be placed directly into a small, stoppered container whereupon the fixative and processing liquids are added and decanted without removing the tissue. At the completion of this process the tissue is embedded in an epoxy resin or other medium and later viewed under the electron microscope. The electron microscopy tissue is not adapted to be placed in the embedding bags because of reaction between the bags and some of the fixation and process liquids used in electron microscopy tissue processes.

From either of the prior art fixation and processing methods, it is evident that when handling light microscopy and electron microscopy tissue extreme care must be used or the tissue will be lost. Therefore, an inordinate amount of time is consumed in preparing microscopy tissue for sectioning which significantly attributes to the increased cost of microscopy tissue fixation and processing. Also, it is apparent that in contacting light microscopy tissues and electron microscopy tissues with their respective fixation and processing fluids, different procedures must be used which unduly complicate an already complicated art.

SUMMARY OF THE INVENTION

Microscopy tissue, either electron or light, is extremely small and generally has at least one dimension in the order of one millimeter or less. Such tissue may be obtained, for instance by needle biopsy, surgical removal from live, anesthetized animals or humans or merely by the removal of a cover slip from a culture medium. The word "animal" as a source is sometimes used herein to cover both human and animal sources. Since cytolytic and post-mortem changes can occur very rapidly and can greatly influence the appearance of the tissue at a fine structural level, the tissue must be brought into contact with the fixative liquid as quickly as possible. Any container into which the tissue may be placed must therefore possess the desired porosity to readily admit the liquid with the pore size being small enough to prevent the tissue from escaping the receptacle.

The receptacle employed in the method of this invention for containing microscopy tissue while being treated with the various fixation and process organic and aqueous liquids includes a porous cylindrical body having a passageway extending axially therethrough to provide the cylindrical body with a pair of open ends. The open ends are enclosed by means of a pair of removable caps which when received by the cylindrical body cooperate therewith to form a cavity for receiving the microscopy tissue. The cylindrical body and the caps are comprised of porous polyethylene, polypropylene, nylon or polyester, all of which exhibit the character of being inert to the fixation and process liquids at ambient temperature or below. The porous nature may be formed by any comomn blowing agent which is admixed with the polymer prior to molding. It is contemplated that the particular blowing agent used forms a foamed, open-cellular product, the cells (hereinafter called "pores") of which have controlled average diameters ranging from about 35 to 200 microns. Porosity in the receptable may also be achieved by grinding the polymer to a desired fineness, inserting the ground polymer is a mold and heating the mold so that the surface areas of the ground polymer particles become tacky and adhere to the adjacent particles. The porosity is determined by the fineness to which the polymer is ground and for purposes of this invention will range from about 35 to 200 microns.

Pore sizes of the described magnitude have a tendency during practice of the method of the invention to restrict or prevent the flow of certain liquids therethrough due to surface tension, viscosity or the like. That is, certain liquids would, under normal gravity flow condition, easily penetrates the receptacle when submerged and completely fill the cavity therein while the receptacle would be impervious to other liquids. For example, alcohol easily penetrates the receptacle when the average pore size is 60 microns but the receptacle is impervious to water even when the pore size is 125 microns. Therefore, for the method of this invention to be operable under the contemplated working conditions, the receptacle must be pervious to all of the fixation and process liquids through which it will pass.

For the purposes of this description, polyethylene shall represent the material comprising the receptacle; however, polypropylene, nylon and polyester and other like compounds which may be provided with the desired porosity and which are not soluble in the fixation and processing liquids or do not in any way materially affect the microscopy tissue may be used.

Therefore, an object of this invention is to provide a method for using a porous receptacle for transporting microscopy tissue through the fixation and processing liquids.

Another object of this invention is to provide a method for using a porous, thermoplastic receptacle having characteristics adapting it to be useful as a vehicle for processing either light microscopy or electron microscopy tissue.

A still further object of this invention is to provide a method of employing a porous, thermoplastic microscopy tissue receptacle which has portions penetratable only by organic liquids and hydrophilically treated portions penetratable by both aqueous and organic liquids.

Other objects and advantages of this invention will become apparent when the following detailed description is read in conjunction with the appended drawings and claims. A preferred embodiment of this invention will now be described with reference to the accompanying drawings, in which:

DETAILED DESCRIPTION OF THE PREFERRED EMBODIMENT

Figure 5:
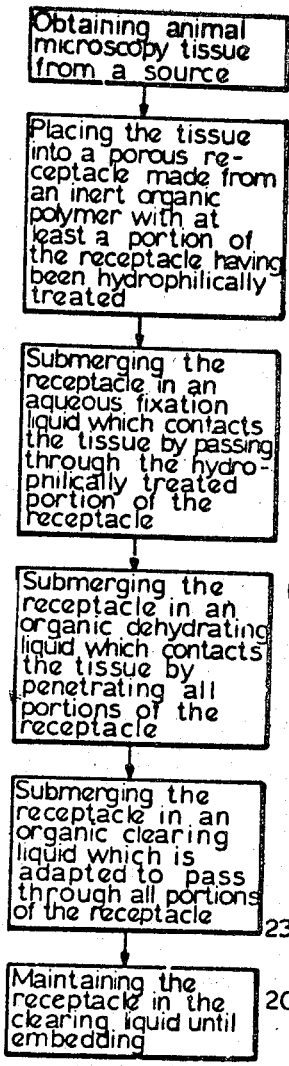
FIG. 5 is a schematic flow diagram showing the method steps of the invention.
Figure 1:
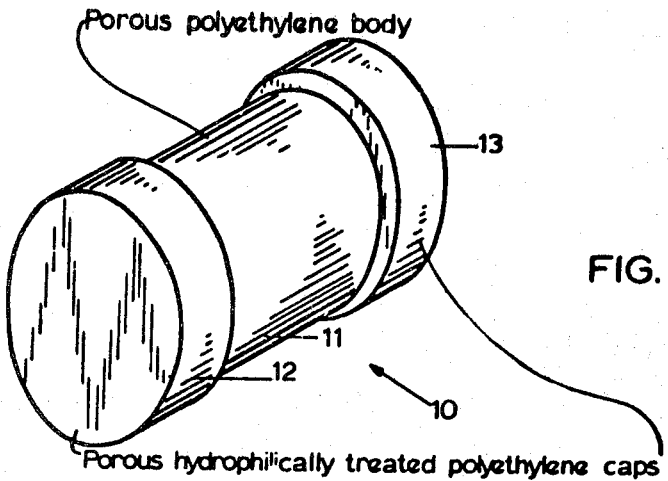
FIG. 1 is an enlarged pictorial view of the microscopy tissue receptacle used in the method of this invention.
Figure 2:
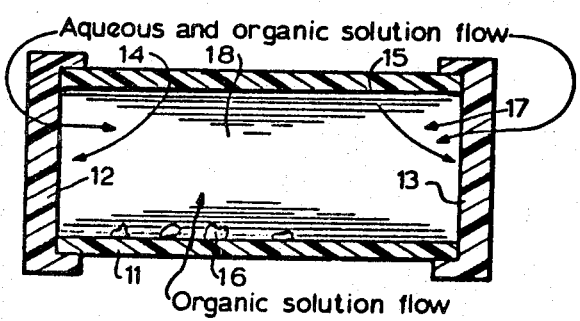
FIG. 2 is an enlarged section view taken along lines 2—2 of FIG. 1 showing the interior construction of the microscopy tissue receptacle.

In reference to FIGS. 1 and 2, a microscopy tissue receptacle 10 useful to the method of the invention is comprised of cylindrical body 11 and caps 12 and 13. Cylindrical body 11 includes a passageway 17 which forms open ends 14 and 15 and which respectively receive caps 12 and 13 to effectively enclose passageway 17 and trap tissue particles 16 in the cavity 18 formed thereby. Microscopy tissue 16 is placed into cavity 18 by removing either of caps 12 or 13 and replacing the same to once again complete the enclosure.

Figure 3:
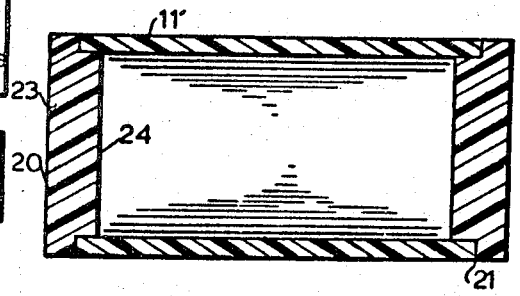
FIG. 3 is the section view of FIG. 1 showing a first alternative cap or closure construction.

As an alternative embodiment for enclosing cylindrical body 11 as shown in FIG. 3, cylindrical body 11' receives caps 20 and 21, caps 20 and 21 being identical in structure. Cap 20 is comprised of a circular base 23 and cylindrical insert 24 which is axially aligned with and extends perpendicularly outwardly from base 23. Base 23 has a diameter substantially equal to the outer diameter of cylindrical body 11' and insert 24 has a diameter substantially equal to the inner diameter of cylindrical body 11' so that it will snugly fit therein and be held by the frictional forces existing between the inner surface of cylindrical body 11' and the outer cylindrical surface of insert 24. A construction of this type conserves space and allows easy access into cylindrical body 11' by engaging base 23 with the thumb nail.

Figure 4:
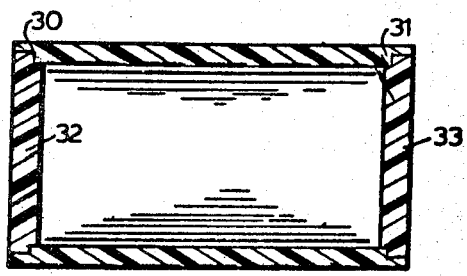
FIG. 4 is the section view of FIG. 1 showing a second alternative cap or closure construction.

A second alternative embodiment for practicing the method of the invention provides for enclosing cylindrical body 11 as shown in FIG. 4. Cylindrical body 11' is provided with seats 30 and 31 which respectively receive caps 32 and 33. Caps 32 and 33 are disc-shaped and have diameters substantially equal to the cylindrical diameters of seats 30 and 31 so that they are frictionally held therein. The main advantage of this embodiment in practicing the method of the invention is the conservation of space and material; however, such caps are more difficult to remove than the other caps shown.

In reference to FIG. 2, caps 12 and 13 according to the invention are hydrophilically treated while cylindrical body 11 is not so treated. This construction allows both the aqueous solutions and the organic solutions to readily pass through the porous caps 12 and 13 while only the organic solutions will pass through the porous cylindrical body 11.

Microscopy tissue receptacles of this invention may be run through various organic liquids such as certain alcohols, xylene and the like and through various aqueous solutions including osmium tetroxide, alcohol, formalin and the like. The receptacle must therefore be liquid pervious to them under normal gravity flow conditions. Polyethylene offers many advantages as a material; however, it is basically hydrophobic or water repelling but is easily wetted with organic fluids. For the method of the invention, at least a portion of the receptacle is made hydrophilic, that is, with an affinity for being wet by and passing water. Since a hydrophilically treated porous polyethylene is more costly to manufacture than one not so treated, the purposes of the invention are achieved by hydrophilically treating a minimum portion of the microscopy tissue carrier. However, the aqueous solutions must be able to flow through the receptacle under a normal gravity flow condition. Such flow is achieved when caps 12 and 13 only are so treated or, alternatively, when only the cylindrical body 11 is treated to the exclusion of caps 12 and 13.

Hydrophilic or wetting agents of the type suited to the invention include certain soaps, glycols, polyols such as glycerine and certain anti-static agents. For example, the porous receptacle used in the method of this invention may be partially or completely hydrophilically treated by forming an aqueous solution with any common hand soap or detergent, immersing the receptacle in the solution and drying the receptacle in heated air or the like. The receptacle may be soaked in an anti-static solution available on the open market under the trademark "Statnul" by Daystrom, Incorporated, Western Instruments Division, Newark, N.J., and dried.

EXAMPLE I

Small tissue fragments obtained by means of a needle biopsy which were to be prepared for light microscopy examination were placed into a polyethylene microscopy tissue receptacle of the type described. The receptacle was comprised of a cylindrical body having an average porosity of 70 microns and hydrophilically treated caps also having an average porosity of 70 microns. The outer and inner diameters of the cylindrical body were 12 and 9 millimeters, respectively, and its length was 11 millimeters.

The fixation process was carried out by submerging the receptacle containing the tissue fragments into an aqueous solution containing 10 percent formalin and next the excess formalin was removed after a period of time by submerging the receptacle in water. Both the aqueous formalin solution and the water rinse easily penetrated all portions of the receptacle. After alcohol dehydration, the tissue particles were then cleared by submerging the receptacle in concentrated xylene whereupon the tissue particles were infiltrated with molten paraffin which was maintained at a temperature of approximately 60° C. Both the concentrated xylene and the liquid paraffin easily penetrated the receptacle.

After being passed through the fixation and process liquids, a selected cap was removed and the tissue particles were each placed in a separating embedding box which received the embedding liquid paraffin.

It was observed that no tissue particles were lost during the process, that all of the liquids easily penetrated the receptacle either through the hydrophilically treated caps or through the body wall and that the tissue particles received all of the fixation and process liquids as readily as if the tissue particles had either been wrapped in gauze or placed directly into a beaker.

EXAMPLE II

The procedure of Example I was repeated with the exception that both the cylindrical body and the caps were hydrophilically treated. The various fixation and process fluids easily penetrated all portions of the receptacle to come into contact with the tissue particles. The results were substantially those noted in Example I.

EXAMPLE III

The procedure of Example I was repeated with the exception that the receptacle was not in any way treated with a hydrophilic material. Under normal atmospheric gravity-flow conditions, the fixative, which was the aqueous solution containing 10 percent formalin, failed to penetrate the receptacle and come into contact with the tissue particles. The remaining liquids including the alcoholic solutions, the concentrated xylene and the liquid paraffin easily penetrated the receptacle.

EXAMPLE IV

In the preparation of small tissue fragments which were to be ultimately sectioned and viewed under an electron microscope, tissue was removed from an animal specimen and cut into small bits having at least one dimension in the order of one millimeter. The fragments were placed into a receptacle identical to that described in Example I.

The fixation process was carried out by submerging the receptacle containing the tissue bits into a buffered aqueous solution of osmium tetroxide which contacted the tissue bits by entering the receptacle through the hydrophilically treated caps. The tissue bits were then rinsed by submerging the receptacle in the buffer used in the osmium tetroxide solution which was cacodylate. The tissue was dehydrated by successively submerging the receptacle in 50 percent alcohol, 70 percent alcohol, 95 percent alcohol and absolute alcohol. All of the concentrations of alcohol quickly penetrated the porous receptacle and contacted the tissue bits. The tissue bits were cleared by submerging the receptacle two separate times propylene oxide whereupon the tissue bits were prepared for final embedding by being submerged in a solution containing 50 percent propylene oxide and 50 percent epoxy resin. Until final embedding, the receptacle remained in this solution. To embed the tissue bits, each bit was removed from the receptacle and placed into a separate plastic capsule whereupon an epoxy resin was added. After hardening, the plastic capsule was removed thus adapting the tissue bits to be sectioned and viewed under an electron microscope.

It was observed that the tissue bits remained in the receptacle throughout the process, that the osmium tetroxide aqueous solution easily penetrated the receptacle and that the receptacle was not damaged by the osmium tetroxide solution.

EXAMPLE V

The procedure of Example IV was repeated with the exception that the average size of the pores in the receptacle was 120 microns and that the caps were not hydrophilically treated. Under normal atmospheric gravity-flow conditions, the osmium tetroxide aqueous solution was not able to pass through the pores of the receptacle even while being held beneath the surface thereof. However, the remaining process liquids including the alcoholic solutions, the propylene oxide and the epoxy resin-propylene oxide solution easily penetrated the receptacle.

EXAMPLE VI

The procedure of Example IV was repeated with the exception that both the cylindrical body and the caps were hydrophilically treated. The various fixation and process fluids easily penetrated all portions of the receptacle to come into contact with the tissue bits. The results were substantially those noted in Example IV.

What is claimed is:

1. A method of processing microscopy tissue through electron microscopy aqueous and organic fixation and processing liquids preparatory to embedding comprising the steps of:
   (a) selecting from the source, the tissue specimen to be processed and of the character of having at least one dimension no greater than one millimeter;
   (b) placing said tissue in a porous receptacle, said receptacle including a body defining an open cavity and removable closure means thereon enclosing said cavity, said body and closure means being comprised of a material inert to said fixation and processing liquids and selected from the group consisting of polyethylene, polypropylene, nylon and polyester, said pores having an average diameter ranging from 35 microns to 200 microns and said receptacle having at least a portion thereof hydrophilically treated, said pores providing the sole path of entry and exit for said liquids to and from said cavity;
   (c) submerging said receptacle containing said tissue in a buffered aqueous fixation solution, said solution contacting said tissue by penetrating said receptacle through said hydrophilically treated portion solely under atmospheric gravity flow;
   (d) removing said receptacle from said fixation solution and dehydrating said tissue by submerging said receptacle in selected organic liquids, said organic liquids contacting said tissue by penetrating all portions of said receptacle solely under atmospheric gravity flow; and
   (e) removing said receptacle from said dehydrating liquids and clearing said tissue by submerging said receptacle in another selected organic liquid, said liquid contacting said tissue by penetrating all portions of said receptacle solely under atmospheric gravity flow, said receptacle remaining in said liquid until embedding.

2. The method of claim 1 wherein said microscopy tissue is sequentially immersed and solely by atmospheric gravity flow through light microscopy aqueous and organic fixation and processing liquids preparatory to embedding.

3. A method of treating microscopy tissue with aqueous and organic fixation and processing microscopy liquids preparatory to embedding comprising the steps of:
   (a) hydrophilically treating at least a portion of a porous receptacle, said receptacle including a body defining an open cavity and a closure means removably received by said body and normally enclosing said cavity, said body and said closure means being comprised of a material inert to said fixation and processing liquids and selected from the group consisting of polyethylene, polypropylene, nylon and polyester, said pores having an average diameter ranging from 35 microns to 200 microns and providing the sole path of entry and exit for said liquids to and from said cavity;

(b) enclosing microscopy tissue having been obtained from a source in said porous receptacle and of the character of having one dimension no greater than one millimeter;

(c) submerging said receptacle containing said tissue in a buffered aqueous fixation solution, said solution contacting said tissue by penetrating said receptacle through said hydrophilically treated portion and solely by atmospheric gravity flow; and (d) removing said receptacle from said fixation solution and dehydrating and clearing said tissue by submerging said receptacle in selected organic liquids, said organic liquids contacting said tissue by penetrating all portions of said receptacle, said receptacle and solely under atmospheric gravity flow remaining in a selected liquid until embedding.

4. A method of processing microscopy tissue through electron microscopy aqueous and organic fixation and processing liquids preparatory to embedding comprising the steps of:

(a) selecting from the source, the tissue specimen to be processed and of the character of having at least one dimension no greater than one millimeter;

(b) placing said tissue in a porous receptacle, said receptacle including a body defining an open cavity and removable closure means thereon enclosing said cavity, said body and closure means being comprised of an organic polymer material inert to said fixation and processing liquids, said pores having an average diameter ranging from 35 to 200 microns and said receptacle having at least a portion thereof hydrophilically treated said pores providing the sole path of exit and entry for said liquids to and from said cavity;

(c) submerging said receptacle containing said tissue in a buffered aqueous fixation solution, said solution contacting said tissue by penetrating said receptacle through said hydrophilically treated portion solely under atmospheric gravity flow;

(d) removing said receptacle from said fixation solution and dehydrating said tissue by submerging said receptacle in selected organic liquids, said organic liquids contacting said tissue by penetrating all portions of said receptacle solely under atmospheric gravity flow; and (e) removing said receptacle from said dehydrating liquids and clearing said tissue by submerging said receptacle solely under atmospheric gravity flow in another selected organic liquid, said liquid contacting said tissue by penetrating all portions of said receptacle, said receptacle remaining in said liquid until embedding.

References Cited
UNITED STATES PATENTS

| | | | |
|---|---|---|---|
| 2,393,580 | 1/1946 | Weiskopf | 117—3 |
| 2,645,618 | 7/1953 | Ferrari | 8—94.11 |
| 2,837,055 | 6/1958 | Whitehead | 118—500 |
| 3,195,502 | 7/1965 | Levy | 118—500 |
| 3,411,481 | 11/1968 | Isreeli et al. | 118—500 |
| 3,479,195 | 11/1969 | Heimann | 117—3 |

MURRAY KATZ, Primary Examiner

U.S. Cl. X.R.

117—113; 8—94.11; 118—500